United States Patent
Fric

[11] Patent Number: 5,437,158
[45] Date of Patent: Aug. 1, 1995

[54] LOW-EMISSION COMBUSTOR HAVING PERFORATED PLATE FOR LEAN DIRECT INJECTION

[75] Inventor: Thomas F. Fric, Schenectady, N.Y.

[73] Assignee: General Electric Company, Schenectady, N.Y.

[21] Appl. No.: 243,609

[22] Filed: May 16, 1994

Related U.S. Application Data

[63] Continuation of Ser. No. 80,548, Jun. 24, 1993, abandoned.

[51] Int. Cl.⁶ .................................. F23R 3/34
[52] U.S. Cl. ......................... 60/739; 60/743
[58] Field of Search ............ 60/733, 734, 742, 746, 60/747, 740; 431/158, 353, 326, 328, 354

[56] References Cited

U.S. PATENT DOCUMENTS

| | | | |
|---|---|---|---|
| 2,911,035 | 11/1959 | Nieman et al. | 431/354 |
| 3,204,682 | 9/1965 | Teleshefsky et al. | 431/354 |
| 3,709,473 | 1/1973 | Ito et al. | 431/353 |
| 4,499,735 | 2/1985 | Moore et al. | 60/739 |
| 4,763,481 | 8/1988 | Cannon | 60/746 |
| 5,161,379 | 11/1992 | Jones et al. | 60/740 |

OTHER PUBLICATIONS

Th. Sattelmayer et al., "Second Generation Low-Emission Combustors for ABB Gas Turbines: Burner Development and Tests at Atmospheric Pressure," 90-G-T-162, 1990, pp. 1-9.

G. E. Andrews et al., "Low No$_x$ Combustor Designs Without Premixing for Aero-Engine Applications," DLR Report 90-01, 1990, pp. 161-174 (no month).

*Primary Examiner*—Timothy S. Thorpe
*Attorney, Agent, or Firm*—Patrick R. Scanlon; Paul R. Webb, II

[57] ABSTRACT

Lean direct injection is used in a gas turbine combustor to reduce NO$_x$ emissions. The combustor has a multi-hole perforated plate disposed at the head end of the combustion chamber. The plate has a plurality of independent fuel jets and air jets for separately injecting fuel and air, respectively, into the combustion chamber in amounts which produce a lean fuel-air equivalence ratio. The perforated plate permits the fuel and air to be injected separately without any mixing outside of the combustion chamber. Fuel is delivered to the fuel jets by a fuel manifold having a branch connected to each one of the fuel jets. Air can be delivered to the air jets by an air plenum chamber located upstream of the perforated plate and in fluid communication with the air jets.

9 Claims, 3 Drawing Sheets

LOW-EMISSION COMBUSTOR HAVING PERFORATED PLATE FOR LEAN DIRECT INJECTION

This application is a continuation of application Ser. No. 08/080,548 filed Jun. 24, 1993 now abandoned.

BACKGROUND OF THE INVENTION

This invention relates generally to combustors for gas turbines and more particularly concerns a combustor using lean direct injection for reduced $NO_x$ emissions.

Traditional gas turbine combustors use nonpremixed ("diffusion") flames in which fuel and air freely enter the combustion chamber separately. Typical diffusion flames are dominated by regions which burn at or near stoichiometric conditions. The resulting flame temperatures can exceed 3900° F. Because diatomic nitrogen rapidly disassociates at temperatures exceeding about 3000° F., diffusion flames typically produce unacceptably high levels of $NO_x$ emissions. One method commonly used to reduce peak temperatures (and thereby reduce $NO_x$ emissions) is to inject water or steam into the combustor, but this technique is expensive in terms of process steam or water and can have the undesirable side effect of quenching CO burnout reactions.

Lean premixed injection is a potentially more attractive approach to lowering peak flame temperature than water or steam injection. In lean premixed combustion, fuel and air are premixed in a premixer section, and the fuel-air mixture is injected into a combustion chamber where it is burned. Due to the lean stoichiometry resulting from the premixing, lower flame temperatures, and therefore lower $NO_x$ emissions, are achieved. However, the fuel-air mixture is generally flammable, and undesirable flashback into the premixer section is possible. Furthermore, gas turbine combustors utilizing lean premixed combustion typically require some conversion from premixed to diffusion operation at turndown conditions to maintain a stable flame. Such conversion capability introduces design complexities and generally raises costs.

Accordingly, there is a need for a dry low $NO_x$ combustion system which does not require premixing of fuel and air prior to combustion.

SUMMARY OF THE INVENTION

The above-mentioned need is met by the present invention which employs lean direct injection for obtaining low $NO_x$ emissions. Lean direct injection is defined herein as an injection scheme which separately injects fuel and air directly into the combustion chamber of a combustor with no external premixing. The fuel and air are injected in controlled amounts so as to produce a lean fuel-air equivalence ratio which produces low $NO_x$ emissions. Since there is no premixing region with lean direct injection, concerns of flashback are eliminated, and complex conversion capability is not needed for turndown because the separate injection of fuel and air is similar to diffusion operation. In addition, a lean direct injection combustor is likely to be more compact and lighter than a lean premixed combustor because any premixing section or sections are eliminated.

Specifically, the present invention provides a lean direct injection combustor comprising a housing having a combustion chamber formed therein. Injection means disposed at the head end of the combustor independently inject controlled amounts of fuel and air into the combustion chamber so as to produce a lean fuel-air equivalence ratio. The injection means independently injects fuel and air into the combustion chamber without mixing fuel and air outside of the combustion chamber.

The injection means preferably comprises a perforated plate having a plurality of fuel jets and a plurality of air jets formed therein. The fuel and air jets are generally evenly distributed about the plate. Preferably, there are fewer fuel jets than air jets, and the fuel jets have a smaller cross-sectional area than the air jets. One preferred embodiment comprises nine fuel jets and twelve air jets evenly distributed about the plate. A manifold is connected to each one of of fuel jets for delivering fuel thereto, and air can be delivered to the air jets via an air plenum chamber which is in fluid communication with the air jets. The air plenum chamber is provided with an air inlet.

Alternatively, an array of multiple perforated plates may be used in place of a single perforated plate. Like the single perforated plate, the multiple plates are positioned so as to define a combustion chamber inside the housing. Each one of the multiple plates has a plurality of fuel jets and air jets formed therein in an even distribution.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
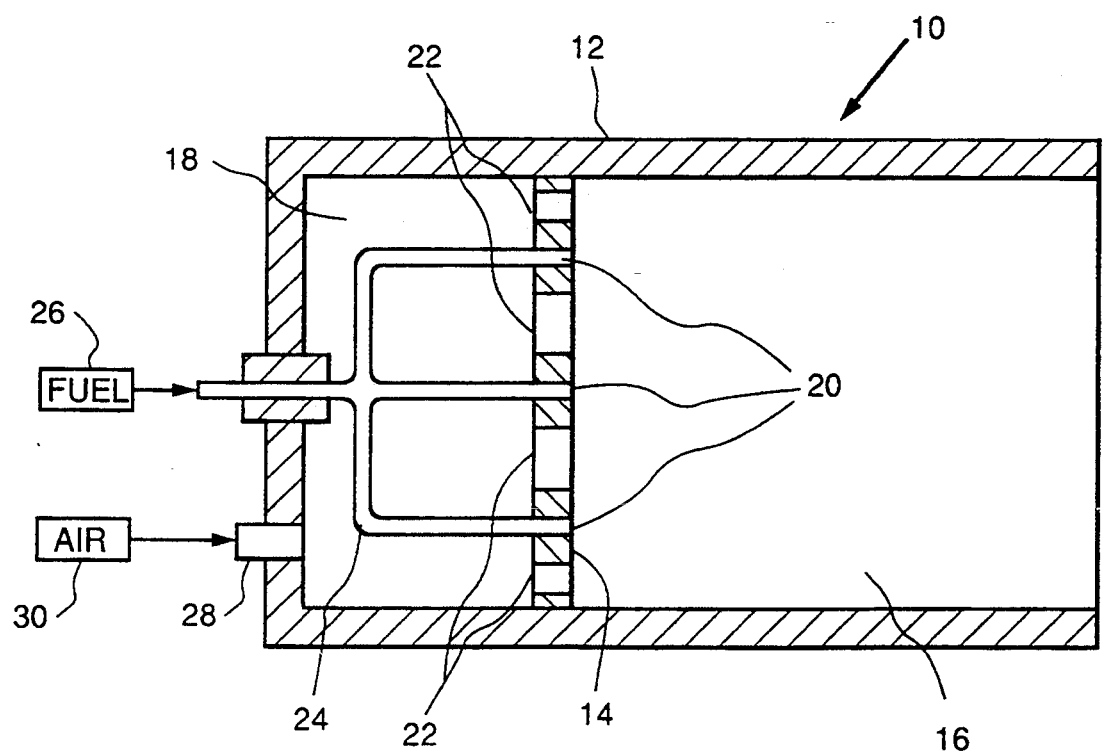
FIG. 1 shows a cross-sectional side view of a lean direct injection combustor of the present invention.
Figure 2:
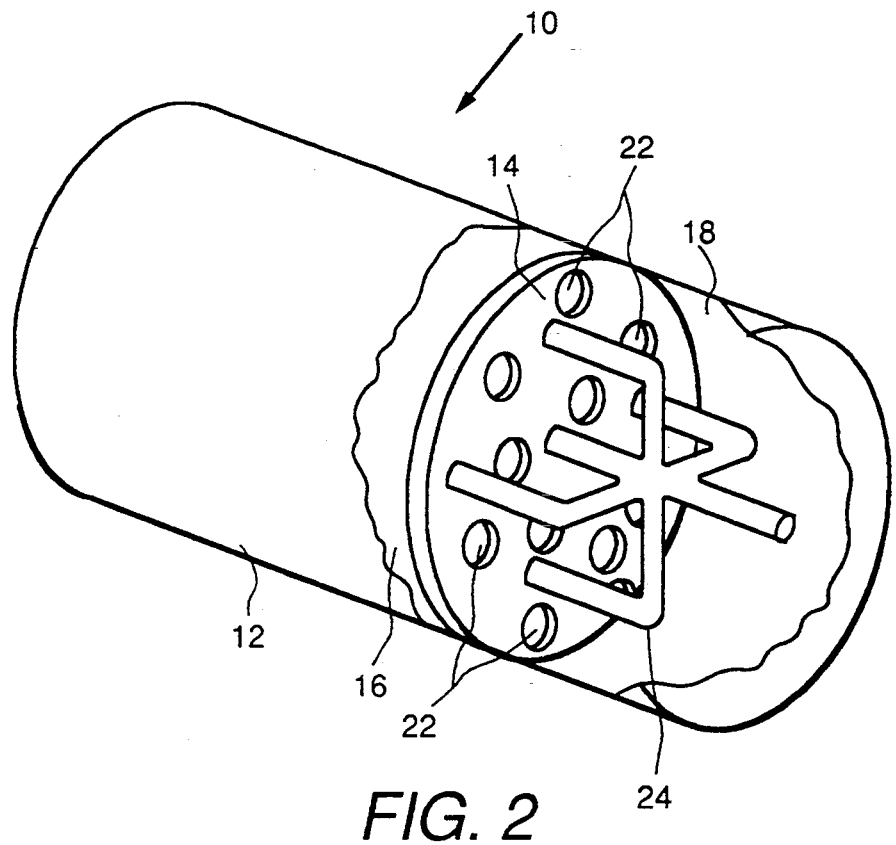
FIG. 2 shows a partially cut-away rear perspective view of the lean direct injection combustor of the present invention.

Referring to the drawings wherein identical reference numerals denote the same elements throughout the various views, FIGS. 1 and 2 show a lean direct injection combustor 10 of the present invention. The combustor 10 comprises a housing 12 which has an open interior. The housing 12 is shown in the form of a cylindrical tube but is not necessarily limited to this shape. A perforated plate 14 is disposed inside the housing 12 at an intermediate location along the longitudinal axis of the housing 12. The diameter of the perforated plate 14 is substantially equal to the inner diameter of the housing 12 so that the plate 14 fits snugly therein. The plate 14 thus divides the interior of the housing into two distinct sections: a combustion chamber 16 adjacent to the downstream side of the plate 14 and an air plenum chamber 18 adjacent to the upstream side of the plate 14. The combustion chamber 16, which is where fuel is burned, may be protected with a liner (not shown) in some cases. The flow of combustion products exiting the downstream end of the combustion chamber 16 is utilized to drive a turbine.

The perforated plate 14 has a plurality of perforations or orifices formed therein. The perforations are divided into two types: fuel jets 20 and air jets 22. As used herein, the term "jet" refers to an opening from which a stream of fluid is discharged. Thus, by definition, the fuel jets 20 and the air jets 22 discharge fuel and air, respectively, into the combustion chamber 16. The fuel jets 20 and the air jets 22 function independently of one another. That is, fuel and air are injected separately into the combustion chamber 16 without any premixing of fuel and air outside of the combustion chamber 16. As shown in the Figures, the fuel jets 20 and the air jets 22 are oriented normal to the planar surfaces of the plate 14. Thus, the jets inject fuel and air axially into the combustion chamber 16. The fuel jets 20 and the air jets 22 may alternatively be oriented at an angle to the plate 14 to produce an angular injection of fuel and air. The angular injection may create some net swirl in the fuel and air streams which will improve flame stability. Angled injection can also be used to direct the flame front away from the wall of the combustion chamber 16, thereby increasing the life of the combustor.

Fuel is delivered to the fuel jets 20 by means of a tubing assemblage or fuel manifold 24. The fuel manifold 24 is primarily disposed in the air plenum chamber 18 and comprises a main trunk section which is connected to an external source of fuel 26 and splits into a number of branches which deliver the fuel to each one of the plurality of fuel jets 20. The air jets 22 receive air from the air plenum chamber 18 with which they are in fluid communication. An air inlet 28 is formed in the housing 12 to provide an input of air to the air plenum chamber 18. The air inlet 28 is connected to a source of air 30 which is typically a compressor. Although shown schematically in FIG. 1 as a simple opening in the housing 12, the air inlet 28 can be configured so that the inlet air flows over the outer surface of the combustion liner. Thus, the relatively cool compressor air will provide backside cooling to the liner. As an alternative to the air plenum chamber 18, air could be provided to the air jets 22 via a manifold similar to the fuel manifold 24. In this case, the air plenum chamber would be eliminated, and the combustion chamber 16 would essentially comprise the entire interior of the housing 12.

Figure 3:
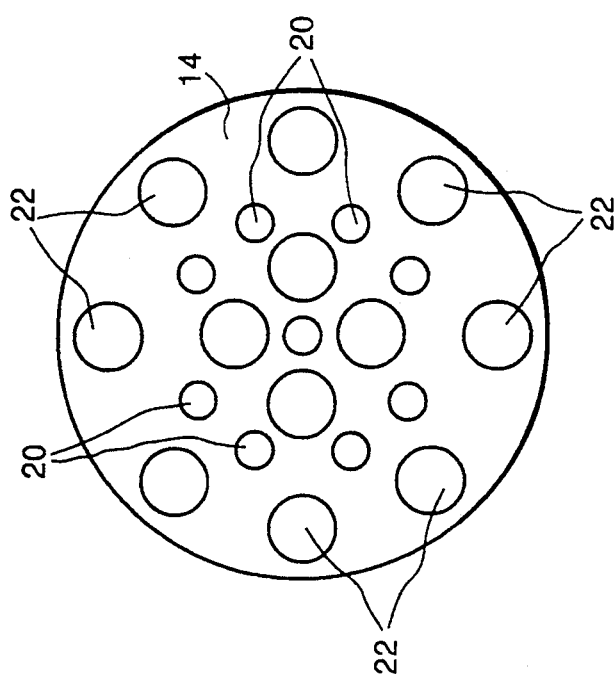
FIG. 3 is an end view of the lean direct injection combustor of the present invention showing a preferred plate configuration.

The number of fuel jets 20 and air jets 22 formed in the perforated plate 14 is not restricted to what is shown in FIGS. 1 and 2 but should be sufficient to provide a uniform flow distribution across the combustion chamber 16. Furthermore, the fuel jets 20 and the air jets 22 should be evenly distributed about the plate 14 to produce a uniform flow distribution. This will also facilitate mixing of the fuel and air in the combustion chamber 16, thereby improving overall efficiency. FIG. 3 shows one preferred configuration having an array of nine fuel jets 20 and twelve air jets 22 evenly distributed about the plate 14. The configuration is such the each fuel jet is essentially surrounded by air jets. The diameter (and thus the cross-sectional area) of the fuel jets 20 is smaller than that of the air jets 22 to ensure that fuel and air are injected in the proper proportions for lean combustion and to accommodate pressure drops typical to gas turbines.

Figure 4:
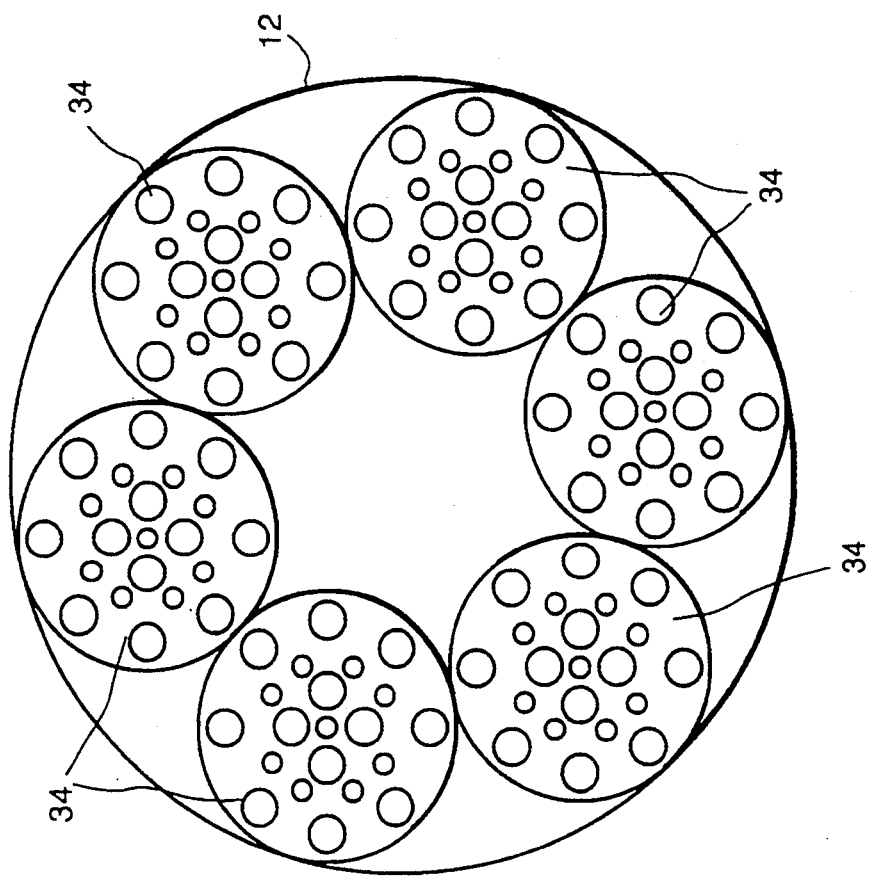
FIG. 4 is an end view of a second embodiment of the lean direct injection combustor of the present invention.

FIG. 4 shows an alternate embodiment wherein the single perforated plate 14 of the first embodiment is replaced with an array of multiple perforated plates 34 disposed in the housing 12. In a multiple-plate arrangement, the housing 12 will generally but not necessarily be annular. As with the single perforated plate 14 of the first embodiment, each one of the multiple plates 34 has a plurality of fuel jets 20 and air jets 22 which are evenly distributed about their respective plates and are oriented either axially or at an angle to the longitudinal axis. The fuel jets 20 on each plate 34 receive fuel from a fuel source via one or more fuel manifolds, and the air jets 22 on each plate 34 can receive air from a common air plenum chamber disposed upstream of the plates 34 or a separate manifold system.

Figure 5:
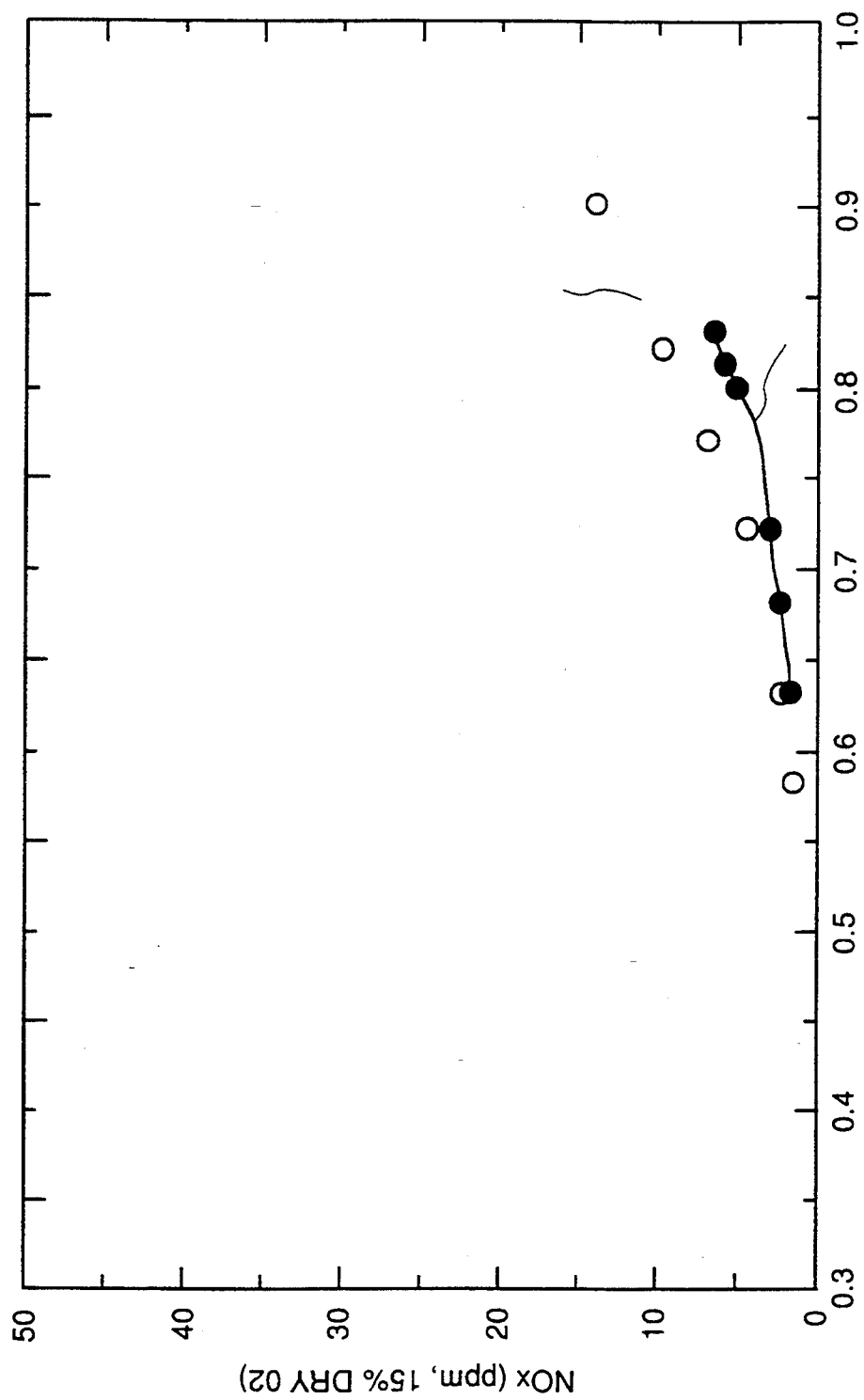
FIG. 5 is a graph comparing the level of $NO_x$ emissions as a function of fuel-air equivalence ratio from an experimental lean direct injection combustor of the present invention to the $NO_x$ emissions from a lean premixed combustor.

The concept of the present invention was tested on a laboratory-scale device which employed an injection plate having the nine fuel jet and twelve air jet configuration shown in FIG. 3. The experiments were performed under atmospheric pressure with no preheating of air and used methane for fuel. The results are shown in FIG. 5 which is a graph plotting $NO_x$ emissions in parts per million against the fuel-air equivalence ratio. Curve A shows premixed combustion data which can be compared with the data collected from the laboratory-scale device of the present invention represented by Curve B. The premixed data were derived using a tangential injection geometry. The results show the $NO_x$ emissions to be below 10 ppm for a wide range of lean equivalence ratios, although it should be kept in mind that these results are based on laboratory-scale experiments. The lean direct injection results compare quite favorably to that of the lean premixed combustion. The fact that the lean direct injection process of the present invention actually produced less $NO_x$ than the lean premixed combustion test can probably be attributed to the different flame shapes produced by the different injection geometries.

The foregoing has described a lean direct injection combustor which provides low $NO_x$ emissions without premixing air and fuel outside of the combustion chamber. While specific embodiments of the present invention have been described, it will be apparent to those skilled in the art that various modifications thereto can be made without departing from the spirit and scope of the invention as defined in the appended claims.

What is claimed is:

1. A combustor comprising:

a housing having an longitudinal axis;

a plate disposed inside said housing at an intermediate location along said longitudinal axis, said plate having a plurality of fuel jets and a plurality of air jets formed therein;

a combustion chamber formed in said housing on one side of said plate;

an air plenum chamber formed in said housing on another side of said plate;

a fuel manifold disposed in said air plenum chamber, said fuel manifold comprising a main trunk tube which is connected to an external source of fuel and a plurality of branch tubes extending from said main trunk tube, each one of said branch tubes being connected to one of said fuel jets; and an air inlet formed in said air plenum chamber.

2. The combustor of claim 1 wherein there are fewer of said fuel jets than said air jets.

3. The combustor of claim 2 wherein there are nine of said fuel jets and twelve of said air jets.

4. The combustor of claim 1 wherein said fuel jets have a smaller cross-sectional area than said air jets.

5. The combustor of claim 1 wherein said fuel jets and said air jets are evenly distributed about said plate.

6. The combustor of claim 1 further comprising additional plates disposed at one end of said combustion chamber, each one of said additional plates having a plurality of fuel jets and a plurality of air jets formed therein.

7. The combustor of claim 1 wherein said fuel jets are angled with respect to said longitudinal axis.

8. The combustor of claim 1 wherein said air jets are angled with respect to said longitudinal axis.

9. The combustor of claim 1 wherein said fuel jets and said air jets are formed so as to produce a lean fuel-air equivalence ratio.

* * * * *